United States Patent [19]
Frederick

[11] Patent Number: 4,573,166
[45] Date of Patent: Feb. 25, 1986

[54] DIGITAL MODEM WITH PLURAL MICROPROCESSORS

[75] Inventor: Carlton Frederick, Ithaca, N.Y.

[73] Assignee: Wolfdata, Inc., Chelmsford, Mass.

[21] Appl. No.: 507,578

[22] Filed: Jun. 24, 1983

[51] Int. Cl.³ .................. H04L 27/18; H03C 3/00; H03D 3/00
[52] U.S. Cl. .................. 375/9; 375/54; 375/67; 375/86; 329/112; 332/21
[58] Field of Search .......... 329/107, 110, 112; 332/10, 16 R, 19, 21; 375/52, 53, 54, 8, 9, 67, 82, 83, 85, 86

[56] References Cited

U.S. PATENT DOCUMENTS

| | | | |
|---|---|---|---|
| 3,131,363 | 4/1964 | Landee et al. | 375/54 |
| 3,553,368 | 1/1971 | Rudolph | 375/54 |
| 3,619,503 | 11/1971 | Ragsdale | 375/54 |
| 3,624,560 | 11/1971 | Milton | 375/67 |
| 3,816,657 | 6/1974 | Fletcher et al. | 375/53 |
| 3,818,135 | 6/1974 | Tannhauser | 332/16 R |
| 3,987,422 | 10/1976 | Yanagidaira et al. | 375/83 |
| 4,292,593 | 9/1981 | de Jager et al. | 375/86 |
| 4,362,997 | 12/1982 | van Driest | 375/120 |
| 4,377,791 | 3/1983 | Bailly et al. | 375/54 |

*Primary Examiner*—Robert L. Griffin
*Assistant Examiner*—Raymond C. Glenny
*Attorney, Agent, or Firm*—Kenyon & Kenyon

[57] ABSTRACT

An all digital modem includes a clock divider for generating four waveforms at a desired transmission frequency but mutually phase shifted by 90 degrees, a first microprocessor programmed to receive digital data at its input, to convert the data into dibits and to select as a modem output one of the four waveforms phase shifted 90 degrees with respect to each other. To demodulate incoming signals, a zero crossing detector detects zero crossings of an incoming modulated signal, a second microprocessor coupled receives the zero crossing information along with parity information and converts the information into dibits, and a third microprocessor receives dibit outputs from the second microprocessor and converts the dibits into a serial stream of data, at essentially constant frequency.

17 Claims, 13 Drawing Figures

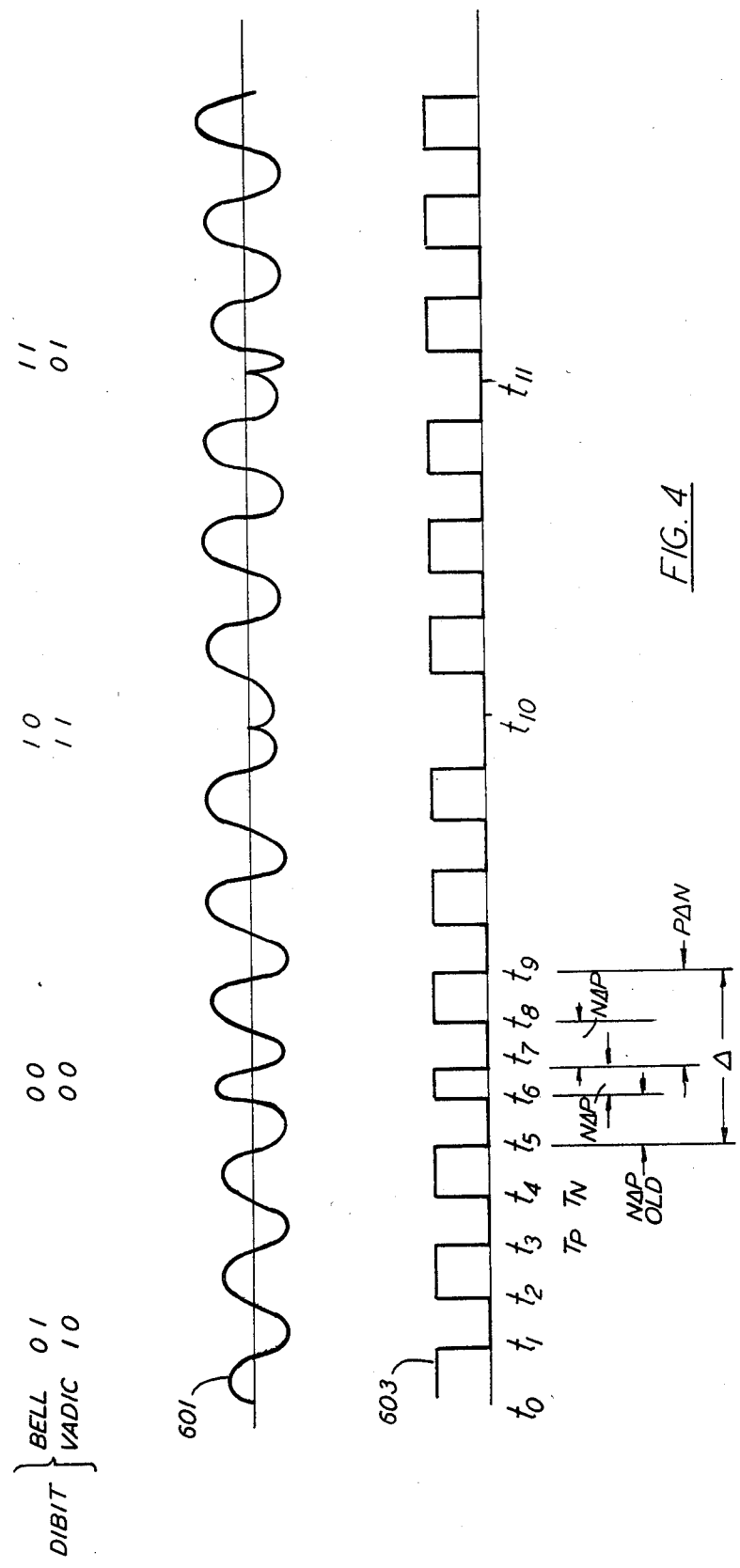

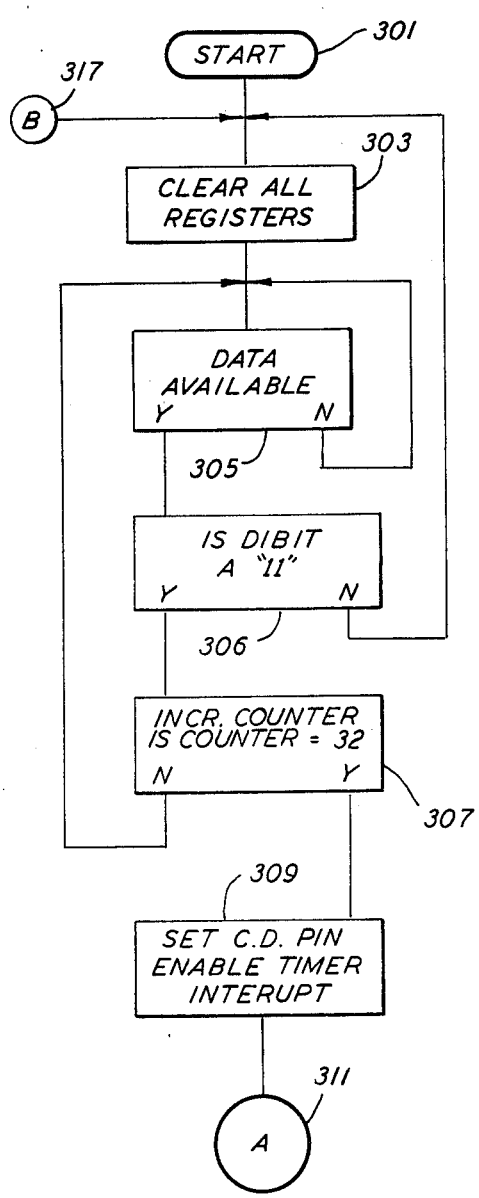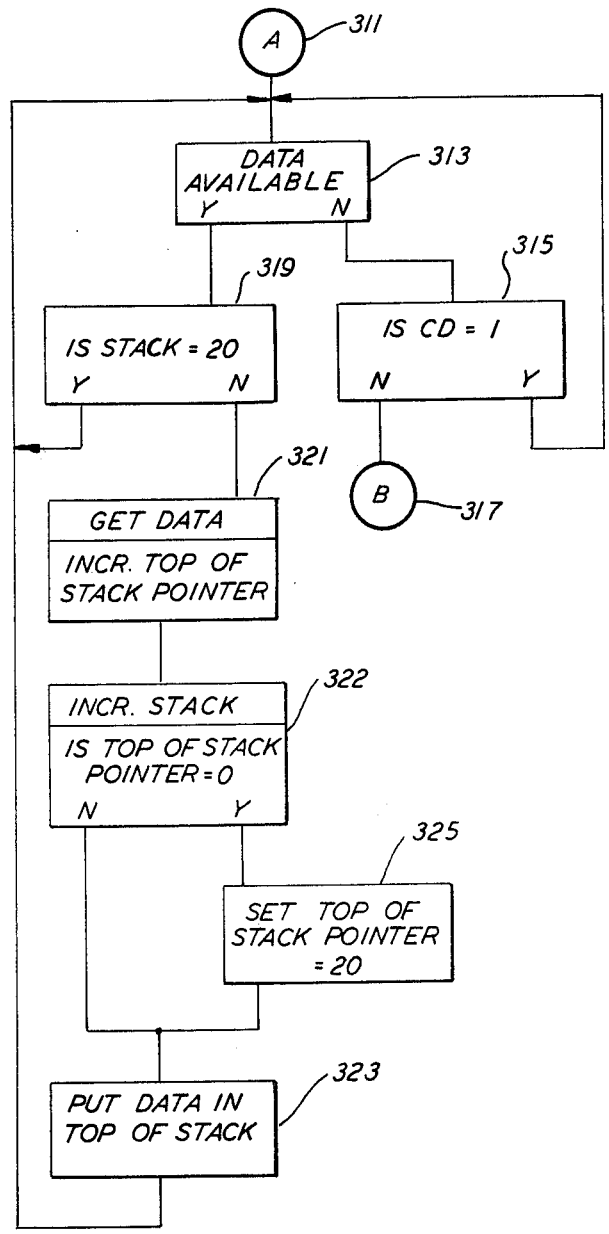
FIG. 8
FIG. 9

DIGITAL MODEM WITH PLURAL MICROPROCESSORS

BACKGROUND OF THE INVENTION

This invention relates to modems in general, and more particularly to a low cost 1200/1200 baud full duplex modem.

Modems are devices which are utilized for converting digital data into a form which permits it to be transmitted over the telephone lines and conversely to transform such data which has been transmitted back into digital data. The rate at which this can be carried out is called the baud rate, a baud corresponding to a bit per second. Inexpensive modems are available which operate at relatively low baud rates of, for example, 300 and which can only operate in one direction at a time. That is to say that they cannot transmit and receive at the same time, as is required for full duplex operation. Modems achieving a 1200 baud rate and a full duplex operation have in the past been relatively expensive. In general, this is because such modems require a large amount of analog circuitry.

It is, thus, the object of the present invention to provide a 1200/1200 baud full duplex modem which can be manufactured and sold at a relatively low cost but which still provides reliable, trouble-free operation.

SUMMARY OF THE INVENTION

The present invention provides such a modem. To accomplish this, a plurality of microprocessors, along with other circuitry is utilized. Two microprocessors control a demodulator which is used for converting received signals into digital data, whereas one or two additional microprocessors control a modulator which converts the digital data into information which can be fed over the telephone line. The modulator and demodulator are coupled to each other through a filter circuit and an appropriate coupler to the telephone system. Full duplex operation is made possible through the use of different modulaton frequencies for sending and transmitting.

The modem uses quad-phase modulation to phase modulate a carrier. The data being transmitted is thus indicated by a phase shift. For example, with the Vadic protocol, no phase shift represents the dibit 10, a 90 degree phase shift the dibit 01, a 180 degree shift the dibit 11 and a 270 degree shift the dibit 01. In the Bell protocol, 0° is 01, 90° is 00, 180° is 10 and 270° is 11.

In general, the demodulator includes a zero crossing detector which converts the incoming signal into a square wave. The phase modulated signal is coupled through a logic driver to a dual one-shot multivibrator which provides outputs corresponding to the leading and trailing edges of squared pulses (the zero crossings). The outputs of the one-shot are fed to a first microprocessor. This microprocessor generates the appropriate dibits. This output is fed to a second microprocessor, which converts this information back into a serial stream of digital data at the proper frequency. The second microprocessor also software implements the bit descramble necessary for the Bell protocol if necessary.

The modulator utilizes a third (if the Vadic protocol is implemented) or third and fourth microprocessor (if the Bell protocol is implemented). The third processor samples the signal to be modulated, puts the sampled data into dibit form, removes or adds start and stop bits (in accord with Bell protocol) and puts the data onto a stack for processing by the fourth processor. The third processor operates at the data rate of the signal to be modulated whereas the fourth processor must transmit at precisely 1200 (or 2400) baud. The fourth processor takes data from the stack of the third processor, scrambles it in accordance with the Bell scrambler protocol. The microprocessor providing the output modulates the signal as follows. The clock output of the output processor (third in a Vadic and fourth in a Bell type) is divided down to toggle at the carrier frequency. The carrier frequency will typically be either 1150 Hz or 2250 Hz for Vadic (1200 or 2400 for Bell). One frequency is used for transmitting and one for receiving. Which is used depends on which modem is the originator and which is the answering modem. The divided output will thus be a square wave. Logic is used to generate four such square wave signals mutually shifted 90 degrees. One of those square waves is selected by closing a switch in response to an output from the output microprocessor in correspondence with the dibit being transmitted. The selected wave is converted to a sine wave by filtering. The final output is then provided through filtering and output circuits to the telephone line At both the input and output, the use of microprocessors has a further advantage over conventional modems in that either serial or parallel data can be handled. With typical prior art modems a conversion of parallel data into serial date outside the modem is necessary.

BRIEF DESCRIPTION OF THE DRAWINGS

FIG. 4 is a waveform diagram showing the manner in which modulation and demodulation is carried out.

FIGS. 8–10 are flow diagrams for the second demodulator microprocessor.

DETAILED DESCRIPTION

Figure 1:
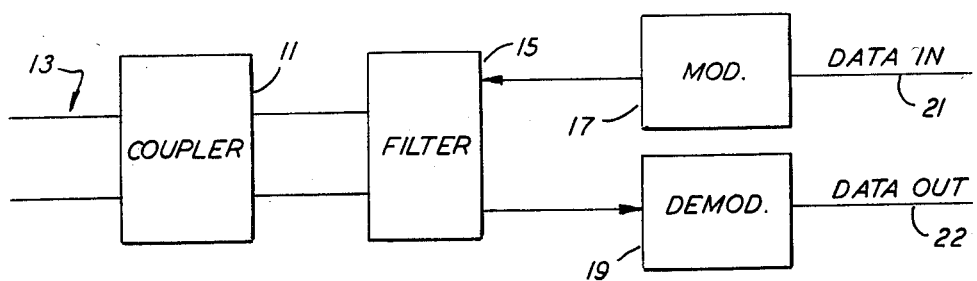
FIG. 1 is a block diagram showing the overall system of the modem of the present invention.

As illustrated by FIG. 1, the modem of the present invention includes a coupler 11 for coupling to the telephone lines 13. The coupler 11 is a device which isolates the modem from the telephone line in a manner complying with FCC regulations. Coupling to and from the coupler is through a filter 15. Filter 15 is utilized to separate the transmitting and receiving frequencies in order to permit full duplex operation. It includes switches so that the filters, one of which operates at the 1150 or 1200 Hz frequency and the other of which operates at the 2250 or 2400 Hz frequency, for example, can be utilized either with the modulator or the demodulator depending on whether this particular modem is the originating or answering modem. The two final elements of the modem comprise a modulator 17 and a demodulator 19. The modulator 17 receives input data from line 21 and converts it to a modulated carrier for transmission over the telephone line 13. The demodulator receives a modulated carrier signal and converts it into binary data on an output line 22.

Figure 2:
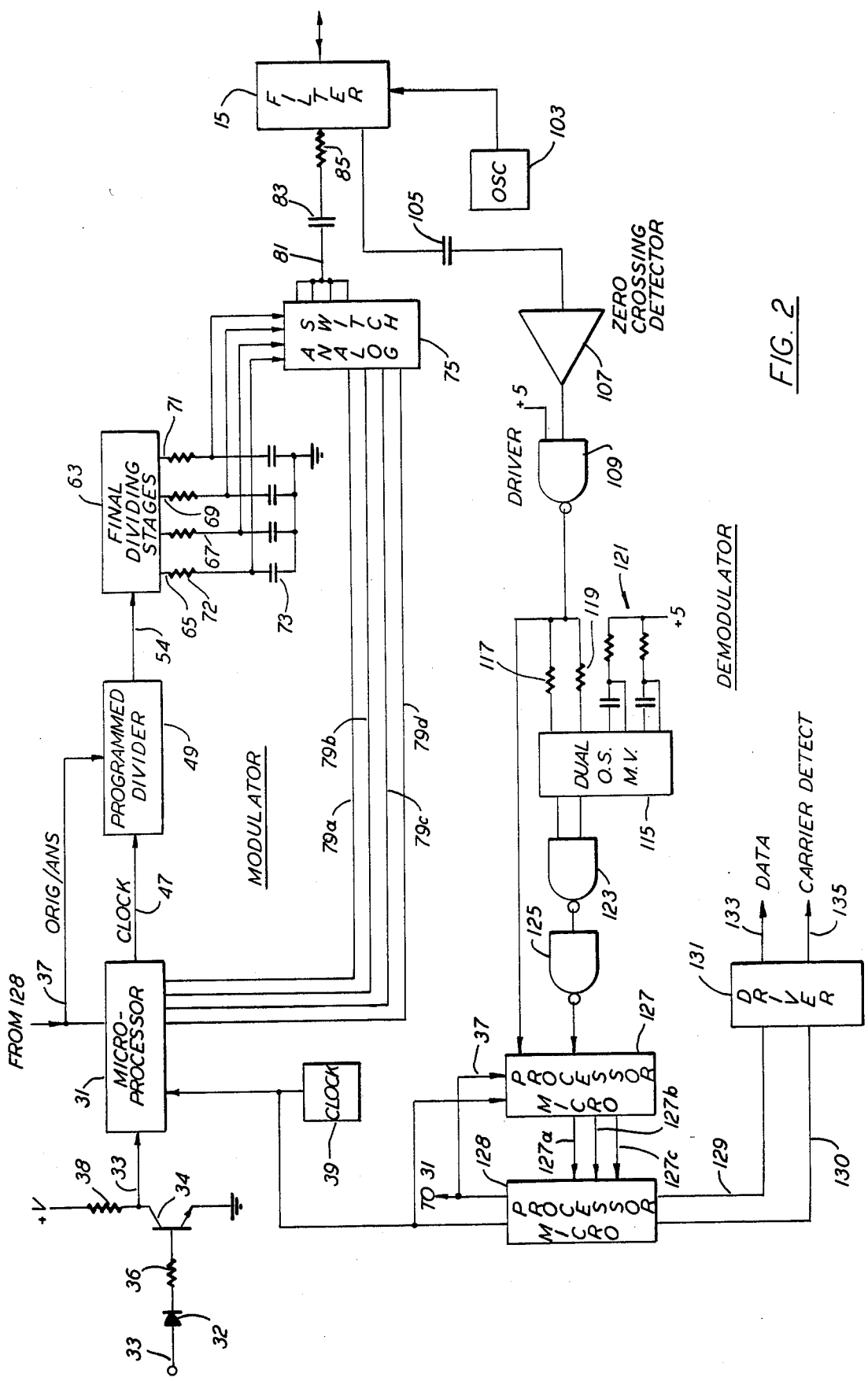
FIG. 2 is a block/circuit diagram of the modem of the present invention employing the Vadic standard.

FIG. 2 is a block/circuit diagram of the modem according to the present invention for use with the Vadic standard. The modulator for the modem includes a microprocessor 31 which is preferably a PIC-1656 or PIC1670 available from general instrument corp. This particular microprocessor includes, in a single chip, not only the processor but also ROM and RAM memory, the ROM memory being for program storage and the RAM memory for data storage. The microprocessor 31 receives data on data input line 33. Data is supplied as serial data through diode 32 and transistor 34, with a base resistor 36 and collector resistor 38. The microprocessor also includes an line 37, coupled to a microprocessor 128, to indicate whether the particular modem is the originating or answering modem. Coupled to an input of microprocessor 31 is a crystal oscillator or clock 39 which establishes the clock frequency for the microprocessor. The microprocessor has a clock output on line 47 at 207 KHz. Depending on whether the modem is the originating or answering modem, an output a frequency of either 1150 or 2250 Hz is required.

The output on line 47 is fed to a programmable divider 49 which can be made up of two commercially available interconnected programmable dividers. The final output from the two dividers is on a line 54. Programming inputs are supplied to divider 49 from line 37. Depending upon whether the needed frequency is 1150 or 2250 Hz, an appropriate division will be made to obtain a frequency on line 54 of either 9000 or 4600 Hz. The final two stages of division are carried out in flip flops contained within a module or final dividing stage 63. The output on line 65 from module 61 will be a square wave at the desired frequency. The signal on line 67 is at the same frequency but inverted. Thus, signals at the same frequency but shifted in phase 180 degrees from each other are provided. These can be the complementary outputs of one flip flop. The outputs of another flip flop in module 61 are shifted 90 degrees with respect to to these first two outputs. These signals shifted 90 degrees and 270 degrees, respectively, are provided on lines 69 and 71. All of the signals are the same frequency of either 1150 or 2250 Hz.

Each of the outputs is coupled through a resistor 72 typically 10K with a capacitor 73 to ground, the capacitor being typically 0.005 MF. The junction of each resistor 72 and capacitor 73 is coupled to one of the four switch inputs of an analog switch module 75. The switches in analog switch module 75 have control inputs on lines 79a–79d, respectively, obtained from the microprocessor 31. The microprocessor 31 determines what serial data has been received and accordingly provides an output on one of the lines 79a–79d to close one of the switches.

The outputs of all the switches are tied together into a line 81 which is coupled through a capacitor 83, typically, 0.1MF and a resistor 85, typically 100K to the input of a filter, in this case a Reticon modem filter model R5632.

Figure 3A:
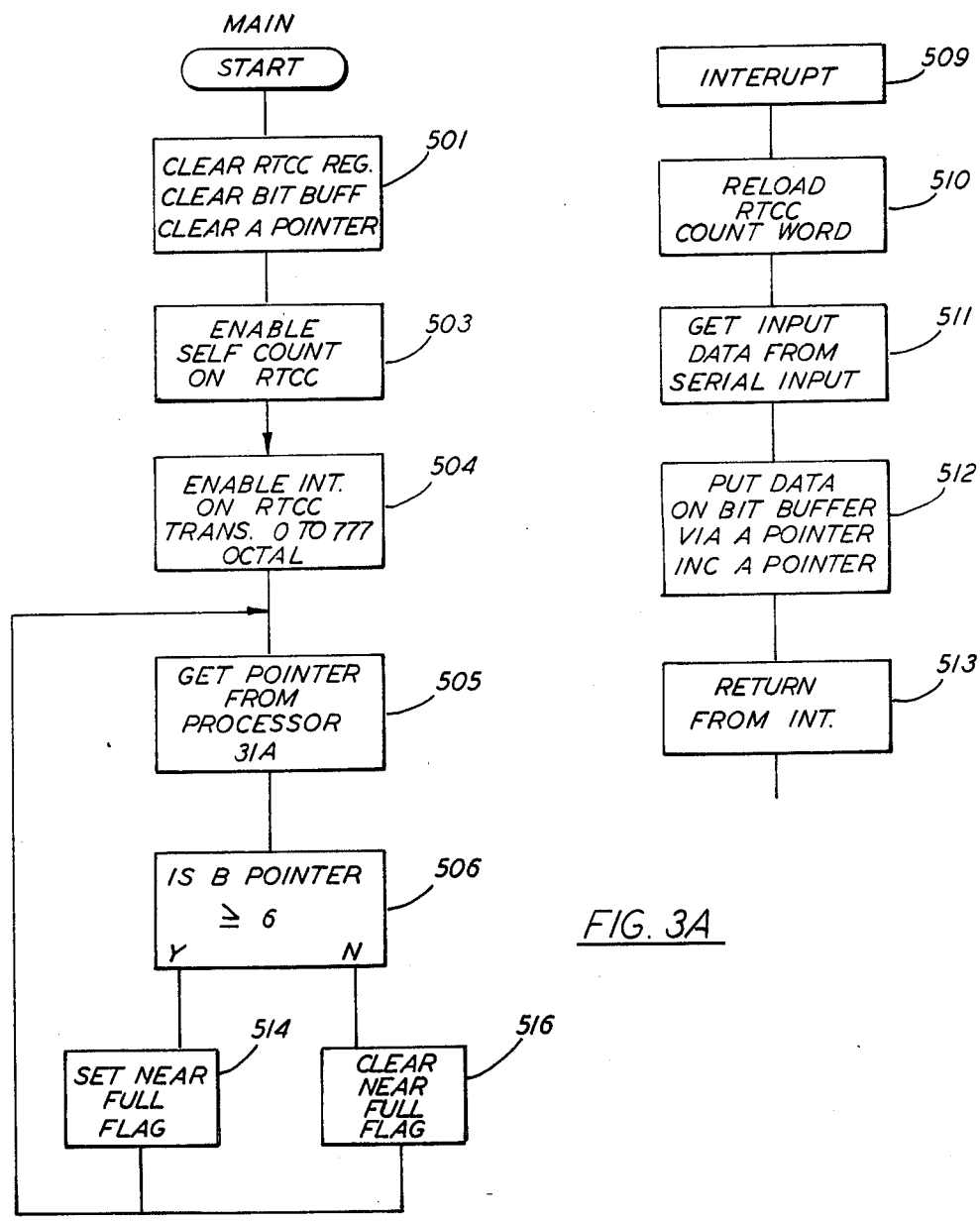
FIGS. 3A and 3B are the flow diagrams for the modulator of FIG. 2A.
Figure 3:
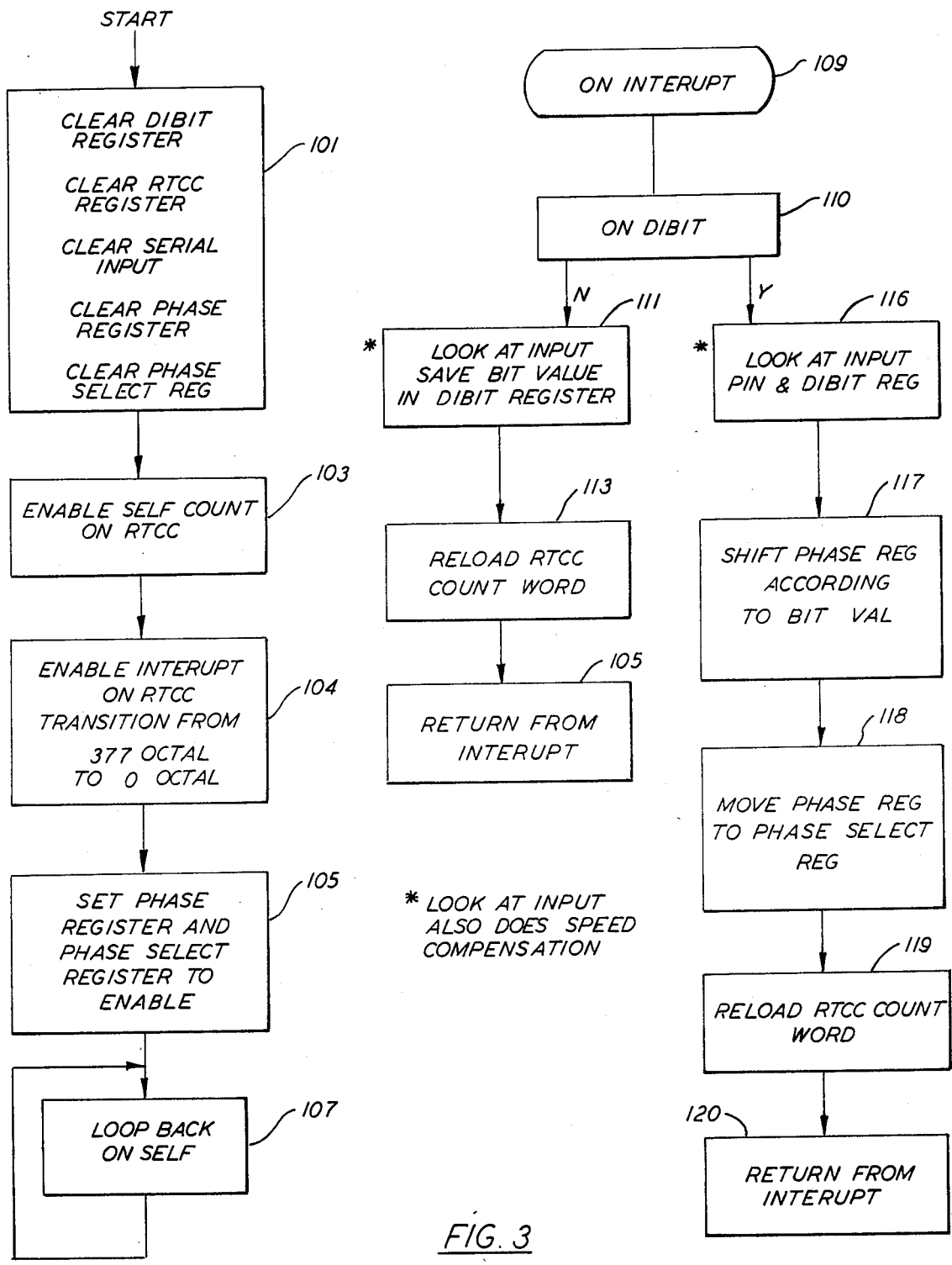
FIG. 3 is a flow diagram for the modulator of FIG. 2.

FIG. 3 is a flow diagram of the program resident in microprocessor 31. When started up, a number of housekeeping chores are undertaken. As indicated by block 101 the dibit register is cleared, the real time clock register cleared, the serial input cleared, the phase register cleared and the phase select register cleared. The dibit register is a register in which the groups of two bits coming in on the serial input 33 are stored. The phase register is a register in which the current phase, based on the current pair of dibits is contained and the phase select register an output register which determined the outputs on line 79a–79d of FIG. 2.

After clearing, the self-count is enabled on the real time clock as indicated on block 103 and an interrupt enabled on the real time clock transition from 377 octal to 0 octal as indicated in block 104. This in effect, enables the interrupt at 1/1200 second intervals. Next, as indicated by block 105, the phase register and phase select register are set to enable followed by a loop operation as indicated by block 107.

As shown on the righthand side of the diagram, actual operation begins on interrupt as indicated by block 109. Next, a check is made to see if there is a dibit, i.e., if two bits are present in the dibit register in block 110. If the answer is No, as indicated by block 111, the program looks at the input and saves it. As indicated by block 113 the RTCC count word is also reloaded. This word is a slight offset to insure that the RTCC makes its transition at exactly 1/1200 seconds. This is followed by a return from interrupt as indicated in block 115. If the answer to the question in block 110 is Yes, that there is a dibit, i.e., that this is the second of two inputs, then the values of the input and dibit register are looked at, this being the dibit information, as indicated in block 116. Based on this information, the phase register is shifted as indicated in block 117.

Referring to FIG. 2, if one realizes that the outputs 79d,c,b and a correspond, respectively, to the first, second, third and fourth positions in a shift register, no shift will result in an output on line 79d, for example. This corresponds to zero phase shift. Similarly, if a one bit shift is carried out the output will appear on line 79c resulting in a 90 degree shift. This shifted information is then moved to the phase select register as indicated by block 118 and is in fact coupled to the outputs 79a and 79d causing one of the switches of FIG. 2 to be closed. Following this, the RTCC count-word is reloaded, as indicated in block 119 and a return from interrupt then takes place as indicated in block 120.

Figure 2A:
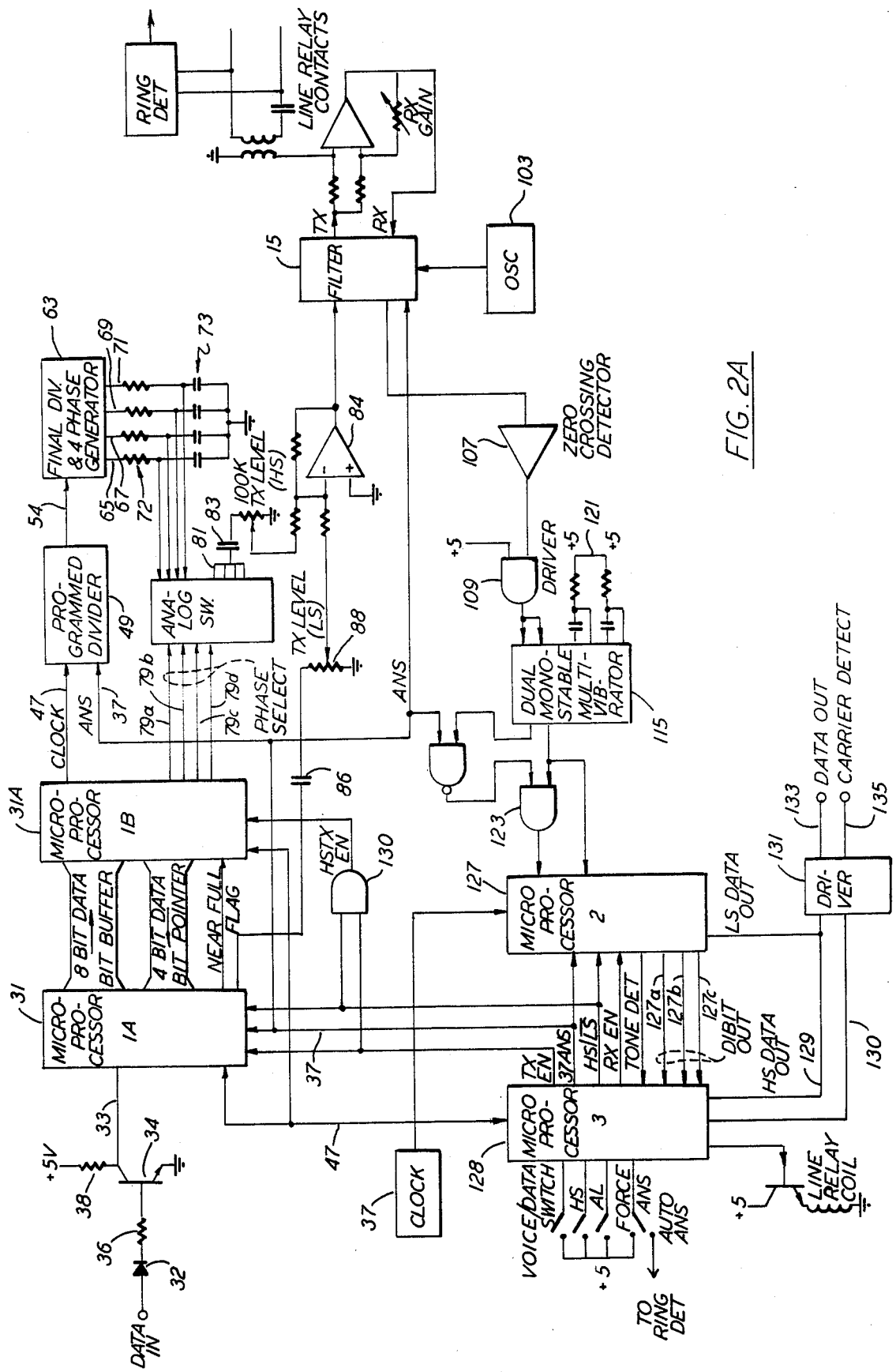
FIG. 2A is a block/circuit diagram of the modem employing the Bell standard.

FIG. 2A is a block/circuit diagram of the modem according to the present invention for use with the Bell standard. Parts the sames as those in FIG. 2 are given the same reference numbers and are only described again where their operation is different. In this embodiment two microprocessors 31 and 31A are provided. Microprocessor 31 receive data as before. Microprocessor 31A has a clock output on line 47 at 240 KHz. Depending on whether the modem is the originating or answering modem, an output frequency of either 1200 or 2400 Hz is required.

Microprocessors 31 and 31A are connected together by an 8 bit data bus from 31 to 31A, a 4 bit data bus from 31A to 31, and a one bit flag from 31 to 31A. Microprocessor 31A provides a 4 bit pointer to microprocessor 31 to indicate which bit in a 8 bit data buffer it is using. A one bit flag is provided as an indication from microprocessor 31 to microprocessor 31A that the buffer is nearly full. The microprocessor 31 determines what serial data has been received and accordingly provides an output on the 8 bit data bus to microprocessor 31A.

The output on line 47 is fed to programmable divider 49. The final output from divider 49 is on a line 54. Programming inputs are supplied to divider 49 from line 37. Depending upon whether the needed frequency is 1200 or 2400 an appropriate division will be made to obtain a frequency on line 54 of either 9600 or 4800 Hz. Again the final two stages of division are carried out in flip flops contained within a module or final dividing stage 63, to provide a square waves at the desired frequency. All of the signals are the same frequency of either 1200 or 2400 Hz.

The switches in analog switch module 75 have control inputs on lines 79a–79d, respectively, obtained from the microprocessor 31A. Microprocessor 31A determines what data has been received and accordingly provides an output on one of the lines 79a–79d to close one of the switches. The outputs of all the switches in module 75 are coupled together into a line 81 which is coupled through a capacitor 83, typically, 1MF and a potentiometer 85 typically 100K to the input of a summing aplifier 84 between the 100K potentiometer and filter 15. The other input to amplifier comes from microprocessor 31 through a capacitor 86 and potentiometer 88. It provides the answer tone and low speed transmitter.

Figure 3B:
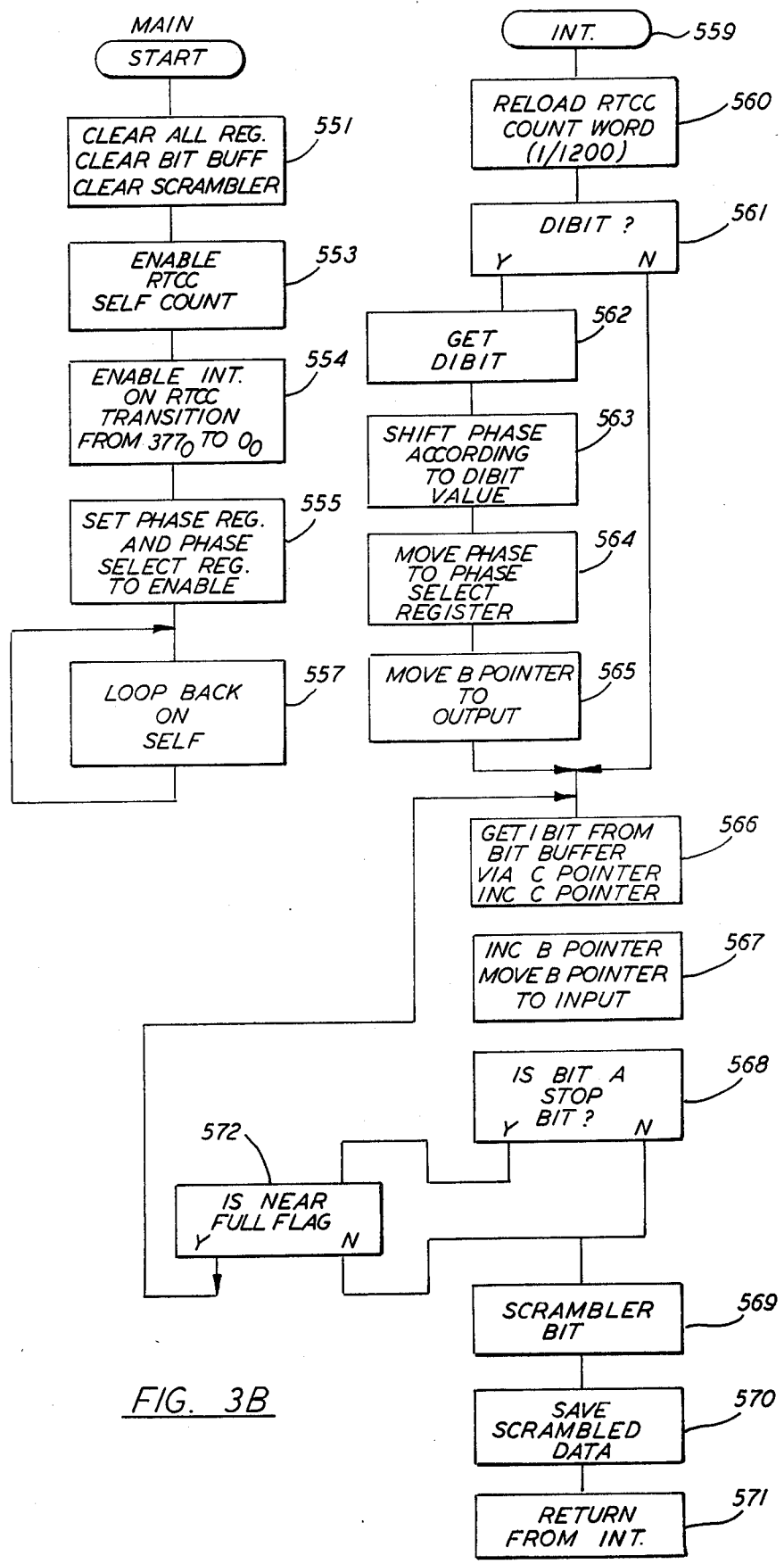

FIGS. 3A and 3B are flow diagrams for microprocessors 31 and 31A of FIG. 2A. The flow diagram for processor 31, is shown in FIG. 3A. In block 501 the real time clock register is cleared, the serial input is cleared, the bit buffer is cleared and the A pointer is cleared. After clearing, the self-count is enabled on the real time clock as indicated on block 503 and an interrupt enabled on the real time clock transition from 377 octal to 0 octal as indicated in block 504. This in effect, enables the interrupt at 1/1200 second intervals. In block 505, the B pointer is retrieved from microprocessor 31A. In block 506, the B pointer is tested to see if it is greater than 6. If it is, the near full flag is set as indicated by block 514. If not, the near full flag is cleared as indicated by block 516. In either case the program returns to block 505.

As indicated in right side of block diagram FIG. 3A, actual operation begins on interrupt as shown by block 509. As indicated by block 510, the RTCC count word is re-loaded. This word is a slight offset to assure that the RTCC makes its transition at exactly 1/1200 seconds. Next, block 511 retrieves data from the serial input. In block 512, the data is put on the bit buffer via the A pointer and the A pointer is incremented. In block 513 the program returns from the interrupt.

FIG. 3B is a flow diagram of the program resident in microcomputer 31A. When started up, a number of housekeeping tasks are performed. As indicated in block 551, all registers are cleared. In block 513, the RTCC self count is enabled. In block 554, the interrupt is enabled on RTCC transition from 377 octal to 0 octal. In block 555, the phase register and phase select register are set to enable. In block 557 the program loops back on itself.

Interrupts operate as follows. As indicated on the right hand side of the diagram, actual operation begins on interrupt as indicated in block 559. As indicated by block 560, the RTCC count word is re-loaded. Next, a check is made in block 561 to see if there is a dibit. If "yes", as indicated by block 562, the program gets the dibit. Block 563 shifts the phase according to the dibit value. In block 564 the phase is moved to the phase shift register (as above). In block 565 the B (bit) pointer is moved to the output. If there is a "no" answer to 561, block 566 gets one bit from bit buffer via the C pointer. The C pointer is incremented. In block 567 the B pointer is incremented and moved to the output. In block 568 the program tests the bit just received to see if it is a stop bit. If "Yes", a test is made on the near full flag (from microprocessor 31) to see if it is set. If it is, the program returns to block 566. If the near full flag is "No" or stop bit is "No", as shown by block 572 program goes to 569 which is the bit scrambler otherwise it loops back to block 566. Block 570 saves the scrambled data. Block 571 returns from interrupt.

FIG. 4 illustrates the manner in which the carrier is modulated. Starting with a positive half cycle 601, for reference, between times t0 and t1, if the data is 01 (Vadic 10), this will be followed by the normal negative half cycle, i.e., there is no phase shift. At the zero crossing at t6, however, if the data is now 00 (Vadic 00), a 90 degree phase shift will take place. Therefore, there will be a jump in amplitude from zero to maximum. When a zero crossover is reached at time t10, and the next data is, for example, 10 (Vadic 11) there will be a reversal of direction, i.e., a 180 degree shift. Finally, at t11, there is shown a 270 degree shift representing the digital data 11 (Vadic 01). This is the type of information then which is transmitted and after transmission and receipt is provided into the demodulator. Returning to the block-logic diagrams of FIG. 2 and FIG. 2A, the demodulator of the present invention will now be explained. As shown, there are two further microprocessors 127 and 128 which receive clock inputs at 3.312 MHz (or 3.84 MHz for Bell) from the same oscillator 39 associated with the microprocesor 31. Line 37 is also provided to microprocessor 127 to indicate if the modem is originating or answering. From microprocessor 128 there is a serial output line 129 on which the digital output is provided and a carrier detect output on line 130. The incoming signal to be demodulated is coupled through filter 15 which as noted above may be a Redicon modem filter. This filter is a switched capacitance filter which receives an input from an oscillator 103. The filter output is coupled through a capacitor 105 into a zero crossing detector 107. Referring to FIG. 4, the incoming sine wave signal is shown as waveform 501 and the output of the zero crossing detector as waveform 503. Note that at each zero crossing, the output changes. The output changes between a level of logic 1 and logic 0. The output of the zero crossing detector 107 is coupled into a driver 109 comprising a NAND gate with its second input tied to +5 volts. The output of the NAND gate provides inputs to a pair of one-shot multivibrators contained within a module 115. The inputs to the two one-shots may be direct as in FIG. 2A or through input resistors 117 and 119, respectively, these typically being 1K resistors. The time constants of the two multivibrators are set by RC circuits 121 in conventional fashion. One of the one-shots triggers on a rising edge and the other on a falling edge of the waveform out of the driver 109. The two outputs are coupled into a NAND gate 123 which performs an ORing function. That is to say, it will provide an output whenever a output pulse is provided by either of the two one-shots. This is coupled through a further NAND gate 125 acting as a driver and inverter to the interrupt input of a second microprocessor 127. Also coupled as an input to the microprocessor is the output of driver 109. This output will be the square wave 503 and thus vary between "1" and "0". By checking this input, the microprocessor can tell whether the zero crossing which caused the interrupt was on a rising edge or falling edge.

As shown in FIG. 2A an additional NAND gate is used at the input of gate 123. Its inputs are from line 37, the ANS line and from one of the multivibrator outputs. The purpose of this gate is to disable one of the zero crossing edges in originate mode.

The microprocessor interconnect lines are as follows:

TX EN—Transmit Enable—From microprocessor 128 to 31, turns transmitter on;

HS/LS High speed command—From microprocessor 128 to 127 and 31, in originate mode, and from microprocessor 127 to 128 and 31, in answer mode. When HS/LS is in "High State", high speed is selected. (TX EN and HS/LS are Anded together in AND gate 130, the output of which is coupled to the enable input on microprocessor 31A);

RX EN—Receive Enable—From microprocessor 128 to 127, turns on receiver; and Tone detect—From microprocessor 127 to 128, tells microprocessor 128 that a carrier is present.

The switches to microprocessor 128 are as follows:

voice/DATA—When on makes the modem enter originate mode;

HS—When on makes the modem originate at high speed;

AL—When on makes the modem enter analog loop; and

FA—Force answer—when on makes the modem enter answer mode.

The purpose of microprocessor 127 is to generate the dibit or phase information from the incoming data. It provides this information to a microprocessor 128 which functions primarily as a timer to provide the dibit information as an output on line 129 through a driver 131 to line 133 and to also provide a carrier detect output on line 130 through driver 131 to line 135.

Figure 5:
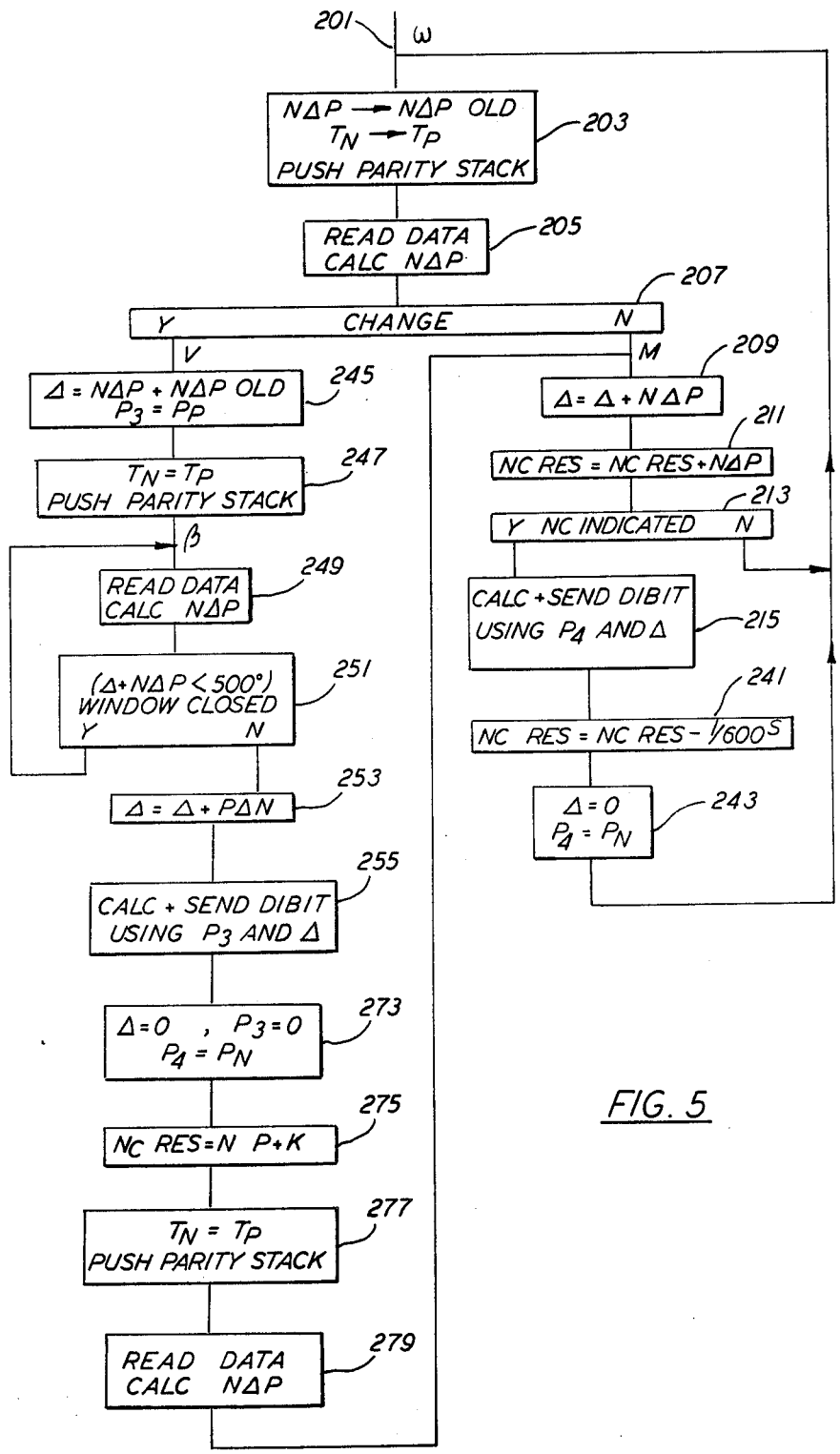
FIGS. 5–7 are flow diagrams of the programs of the first demodulator microprocessor.
Figure 6:
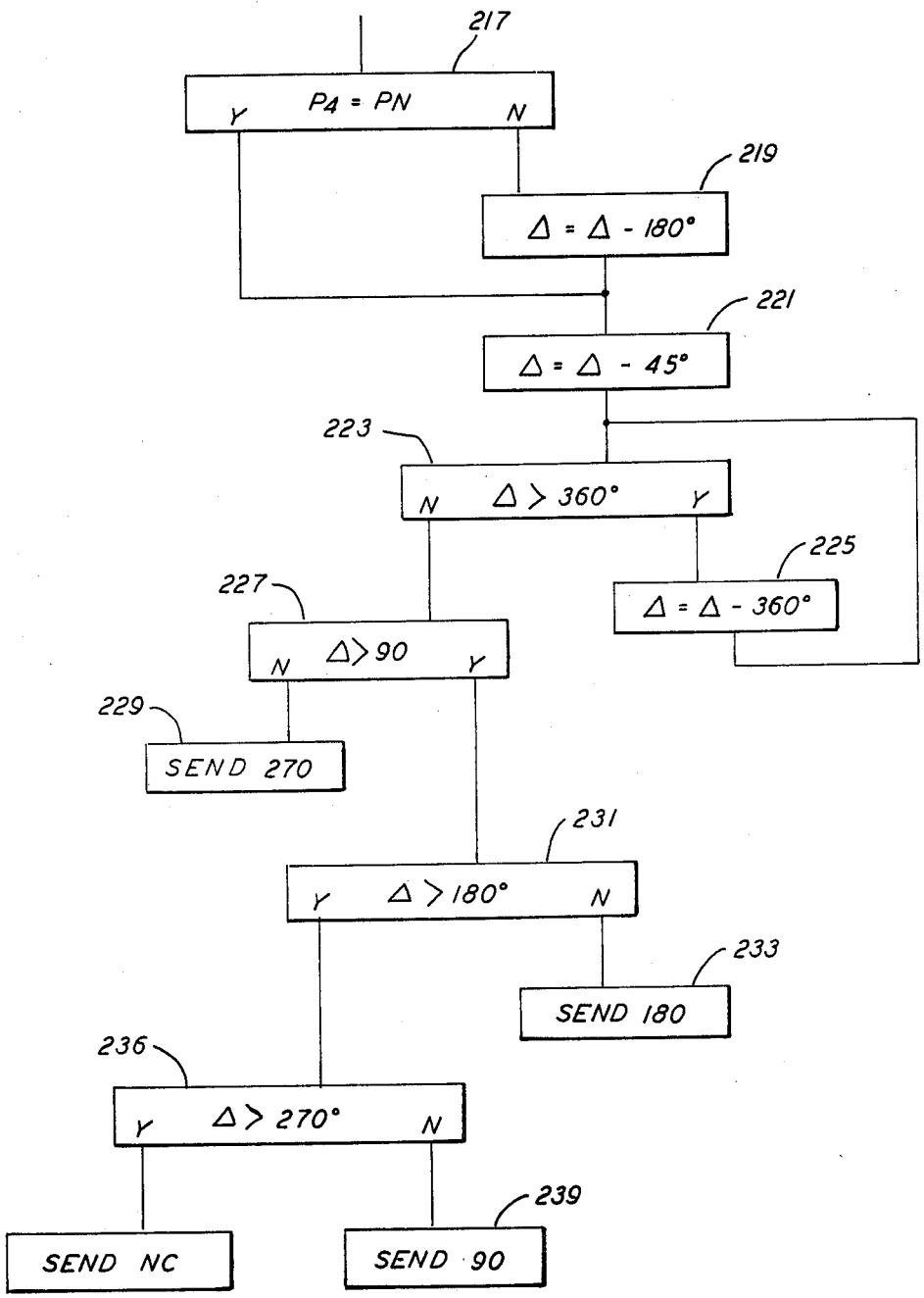
Figure 7:
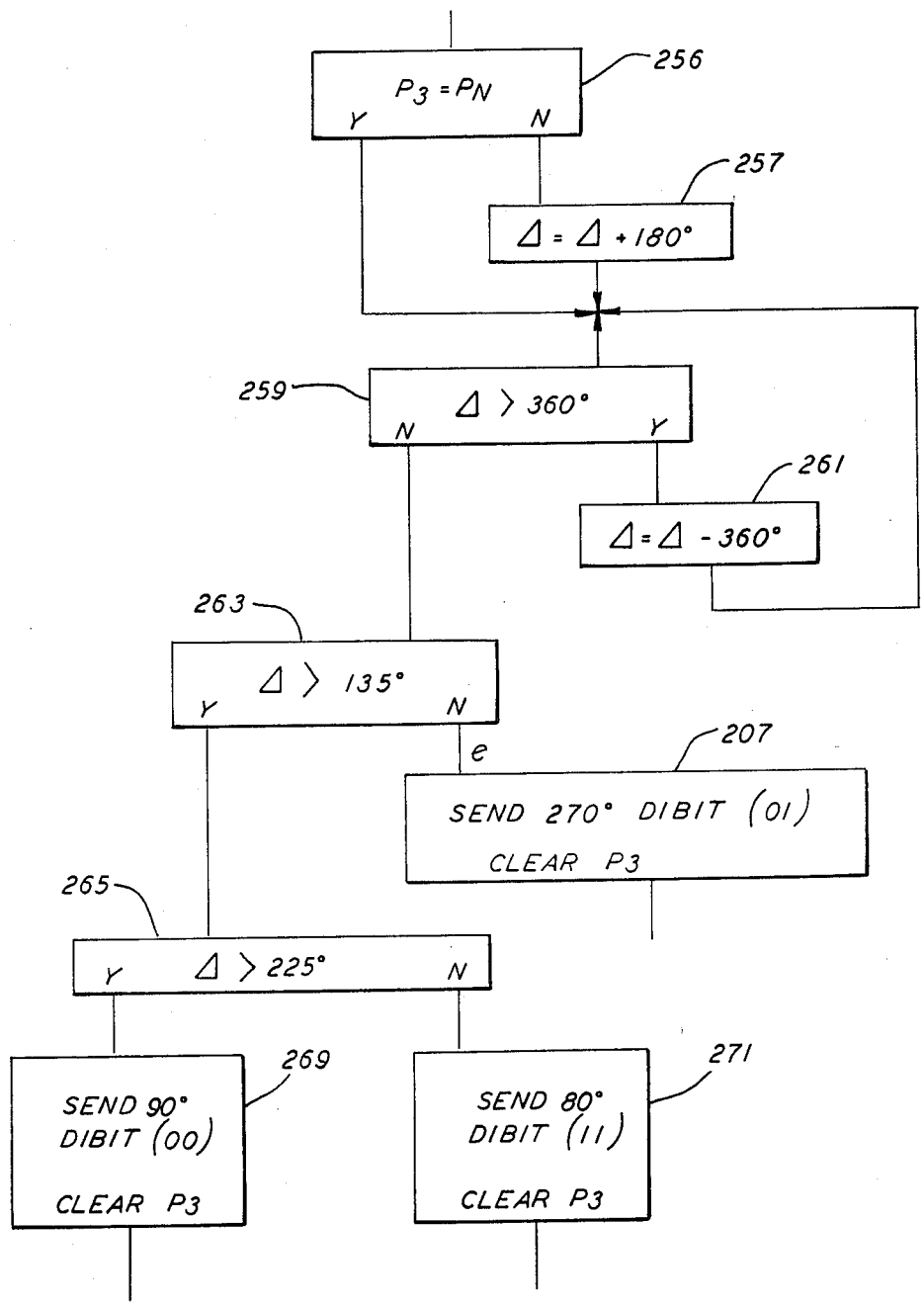

FIGS. 5, 6 and 7 are software flow diagrams for microprocessor 127. The program begins at poing 201. First a block 203 is entered where quantity N$\Delta$P, which is in a register storing the present value of that quantity is moved into the register for N$\Delta$P old for storing the last value of that quantity. Similarly, the "time now" is shifted to the "time past" ($T_P$) register, and the parity stack is pushed, the parity stack being an indication of the input received on line 126. Now that the registers have been cleared, data is read in block 205. Basically, this data is the time $T_N$ and the parity on line 126. A calculation of N$\Delta$P is then made, N$\Delta$P being the difference between the time past and the time now ($T_N - T_P$).

Next in block 207, a check is made to see if there has been a change in phase. What is meant by a change is a gross change, e.g., a change of between 150 degrees and 230 degrees. This insures that change will be indicated only when a real change has taken place. Because there is drift in the system, treating small variations as actual changes could result in error.

Assuming that change has not taken place, block 209 is entered where the quantity $\Delta$ is calculated as $\Delta + N\Delta P$. Referring to FIG. 4, assume that the measurement has been made at time t4. This then is $T_N$ the previous time $T_P$ would be the time at t3 and N$\Delta$P the difference in time between these two. In block 209 the quantity $\Delta$ is computed which is equal to the previous $\Delta + N\Delta P$. The previous $\Delta$ is the sum, since the last time $\Delta$ had been set to zero of the increments N$\Delta$P. Thus, if we assume that $\Delta$ was set to zero at time t0 there will already be three increments of N$\Delta$P in the quantity $\Delta$ and the fourth will now be added. In the next block 211 something called the "no change reservoir" is updated by having added to it the quantity N$\Delta$P. The "no change reservoir" is a register which is adapted to overflow when the quantity stored in it indicates a time of more than a 1/600 of a second. The assumption is made here that the system is operating on a 2400 Hz and that changes take place every 1/600 of a second or every four cycles. It is possible, of course, to operate at other frequencies, for example 1200 Hz in which case changes taking place at every 1/600 of a second will take place every two cycles. In theory, the samples are every 1/600 of a second. However, there is shift and drift and it is for this reason that the change detected in block 207 is detected as a gross change.

Returning to block 211, its output is directed to block 213 which is a block determining whether there is a change or no change. This block responds to the overflow from the "no change reservoir." If there is no change, the output of block 213 is directed back to the input of block 203 and the process repeated and another reading taken. Thus, a reading would be taken at time t5. The value at t4 now becomes $T_P$ and the value at t5 becomes $T_N$. Readings continue to be taken until the "no change reservoir" overflows. Then the program enters block 215. This block represents a subroutine which is shown in detail in FIG. 6.

As indicated in FIG. 6, in block 217, a check is made to see if the partiy bit $P_4$ is equal to the present parity bit, $P_N$. In effect, this is checking to see whether what is being done is being done on a rising or falling edge. The parity bit $P_4$ was set previously when the system was re-zeroed in a manner which will be described below. If $P_4$ is not equal to $P_N$ then in block 219, $\Delta$ has subtracted from it 180 degrees. Then, in block 221, is made equal to $\Delta$ minus 45 degrees. This in effect establishes an offset to take care of drift problems. Next, in block 223 there is check made to see whether is greater than 360 degrees. One can speak of degrees here even though measurements are made in time since there is known frequency. If $\Delta$ is greater than 360 degrees, 360 degrees is subtracted from $\Delta$ in block 225 and block 223 re-entered. This continues until $\Delta$ is below 360 degrees. Then, block 227 is entered where a check is made to see if $\Delta$ is greater than 90 degrees, if it is not, then according to block 229 the 270 degree dibit is sent. If "yes", block 231 is entered to see if is greater than 180 degrees. If it is not greater than 180 degrees then the 180 degree dibit is sent. Note that this, in effect, means that the value is between 90 and 180 degrees. Thus, if the phase had been exactly 180 degrees, the offset of 45 degrees would put it at 135 degrees, exactly midway between these two limits. If $\Delta$ is not greater than 180 degrees block 233 is entered and the 180 degree dibit sent. If is greater than 180 degrees then block 235 is entered and a check made to see if it is greater than 270 degrees. If it is greater than 270 degrees, then no change is sent. If it is not greater than 270 degrees, then according to block 239 the 90 degree dibit is sent.

The main program of FIG. 5 now resumes with block 241. In this block the "no change reservoir" has subtracted from it 1/600 of a second. This, in effect, sets it close to zero but with a little offset as will be described below. In block 243$\Delta$ is set to zero and $P_4$ is reset equal to $P_N$ The program then returns to block 203.

Assume that a detectable change does occur. Such a change does show between t6 and t7. At t6, there was a 90 degree jump. Now, block 245 is entered. Here, is set equal to $\Delta NP + \Delta NP$ old, $\Delta NP$ old is the time between t5 and t6 and $\Delta NP$ the time between t6 and t7, thus, $\Delta$ is set to be the time between t5 and t7. $P_3$ is set equal to $P_p$, i.e., P present. $T_N$, present time, is put into the past time $T_P$ register in accordance with block 247. Now block 249 is entered which reads data and calculates N$\Delta$P. This then would be the time between t7 and t8. Next, a check is made to see in block 251 to see if $\Delta$+N$\Delta$P is less than 500 degrees, if it is less than 500 degrees, the program moves back to block 249. It continues in this loop until the value tested exceeds 500 degrees. By time t9 this will have occurred. The total value checked in block 251 is now set equal to the previous $\Delta$+P$\Delta$N or the period between t7 and t9. $\Delta$ was originally equal to approximately 270 degrees. After the first addition check it would be equal to 450 degrees, and then with an additional 180 degrees it will be equal to 630 degrees. Now that $\Delta$+N$\Delta$P is greater than 500 degrees, i.e., not less than 500 degrees, block 253 is entered and N P added to $\Delta$.

Block 255 is now entered which is another subroutine for calculating the dibits shown in FIG. 7. As indicated, first in block 256, a check is made to see if $P_N$, the present parity bit is equal to $P_3$. Remember that $P_3$ was set at the detection of a change or at the time t7. That was a downgoing transition. $P_N$ at t9 is also a downgoing transition and so the answer is "yes". Had the answer been "no", a block 257 would have been entered where $\Delta$ was set equal to $\Delta$+180 degrees. Block 259 is now entered, to check if is greater than 360 degrees. Since it is, block 261 is entered and 360 degrees subtracted from $\Delta$. After one subtraction the value will be 270 degrees and the answer NO. Thus, block 263 is entered. The question is whether $\Delta$ is greater than 135 degrees. It is greater than 135 degrees so block 265 is entered. Had it been less than 135 degrees then block 267 would have been entered and the 270 degree dibit would have been sent and $P_3$ cleared. In block 265 there is a check made to see if is greater than 225 degrees. The answer is "yes", it is 270 degrees, and thus, block 269 is entered causing the 90 degree dibit to be sent and again $P_3$ to be cleared. Had the answer been "no", block 271 would have been entered and the 180 degree dibit sent and again $P_3$ cleared. In this case, the no change or zero degree dibit cannot be sent since, by definition, this path will not be entered unless there is a change.

In this subroutine, note that the offset is obtained in a slightly different fashion. Instead of subtracting 45 degrees as was done in the subroutine of FIG. 6, the limits are offset by 45 degrees.

The main program is resumed with block 273 of FIG. 5. Here is set to zero, $P_3$ set to zero and $P_4$ set $P_N$, the last value of p. In block 275 the "no change reservoir" is set to N$\Delta$P plus a constant. This step corresponds, in general, to the step of block 211. Next, as indicated by block 277, $T_N$ is moved to $T_P$ and the parity stack is pushed. This is equivalent to what is done in block 203. Then in block 279 data is read and N$\Delta$P is calculated. This corresponds to what is done in block 205. These steps are carried out rather than going back to block 203 since it is desired to run through the righthand portion of the program at least once before going through block 205 and again checking for a phase change. After leaving block 279, block 209 is entered and the program proceeds in the manner described above.

The new starting point, i.e., the new value starting with the value N$\Delta$P is thus, reset to a reasonably accurate point. The reason for adding a constant in block 275 is to insure that when a quantity corresponding to 1/600 of a second is exceeded the reservoir will overflow.

Referring now to FIGS. 2 and 2A, there are three lines 127 a, b and c coming out of microprocessor 127 into microprocessor 128. On two of these lines are the dibit and on the third is a signal to set a flip flop indicating that data is ready. Data is transferred from microprocessor 127 to microprocessor 128 approximately every 1/600 of a second with data provided two bits at a time. Microprocessor 128 must provide the data out one bit at a time at 1/1200 of a second. Furthermore, the output of microprocessor 127 is not at a particularly accurate rate. Thus, the microprocessor 128 in addition to converting the stream of dibits into a string of single bits must also smooth out the rate of output so that it is close to the desired 1/1200 of a second rate. In addition, it is adapted to make small adjustments in output rate depending on whether or not it has a sufficient backlog of data from microprocessor 127.

Figure 10:
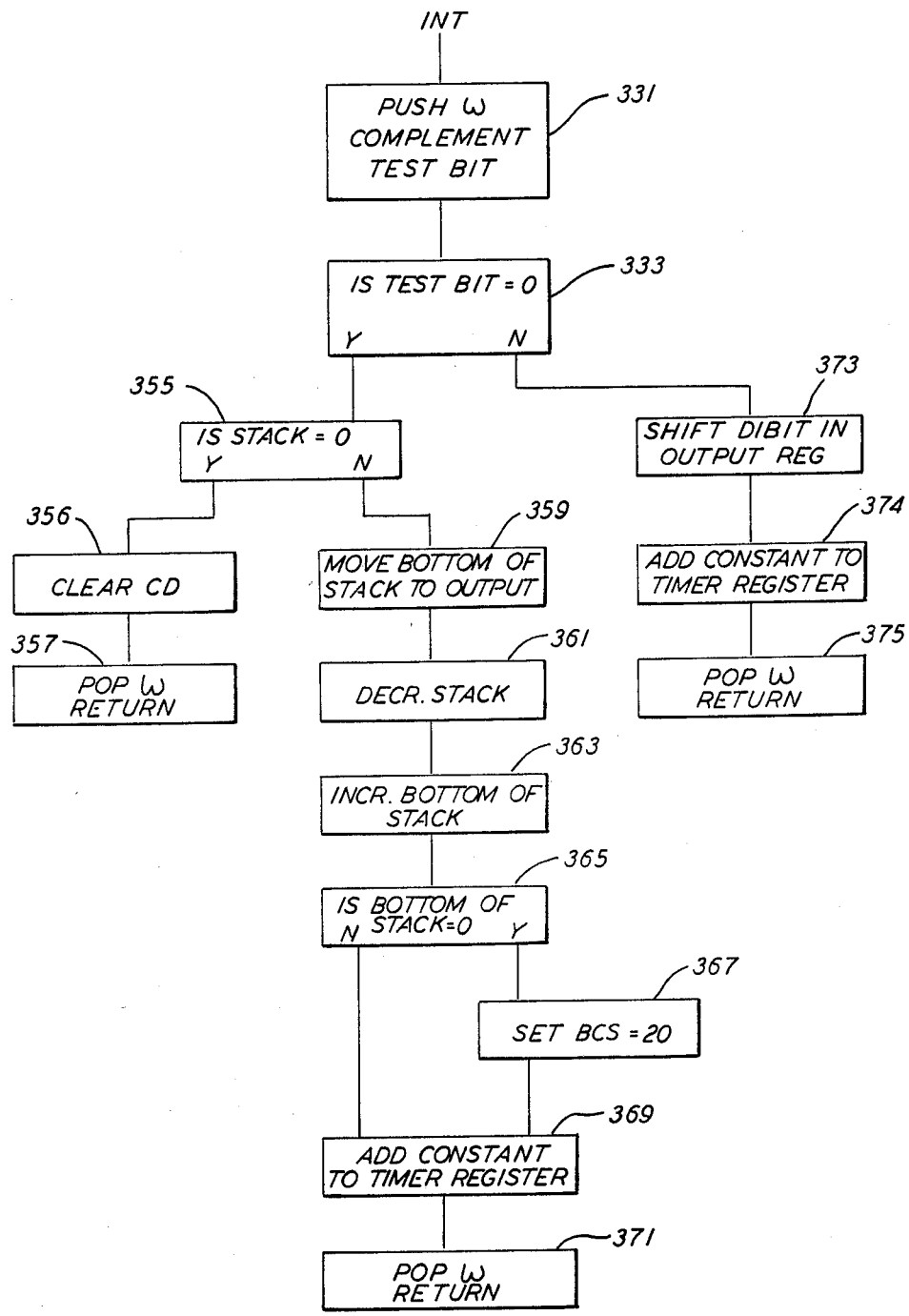

FIGS. 8, 9 and 10 are flow diagrams illustrating operation of the microprocessor 128. The program starts at point 301 of FIG. 8. First in block 303 all registers are cleared. A block 305 is entered where there is a check made to see if data is available. This is a check of whether or not the flip flop has been set by the third line from microprocessor 127 has been set. If data is not available, it continues to cycle back to the input of block 305. If data is available, block 306 is entered. There, a check is made to see if the dibit is a 11. If it is not a 11 the program loops back to block 303. When a 11 is detected, indicating the presence of a carrier, block 307 is entered. Here, a counter is incremented and a check made to see if the count is equal to 32. If the count is not equal to 32, it loops back to the input of block 305. Assuming a carrier is present, this loop will be transverse until the counter of block 307 reaches a count of 32, at which point block 309 will be entered. The output on line 135 indicating a carrier detect will be set and the timer interrupt, to be explained below, will be set. As indicated by the circle a 311, also shown in FIG. 9 a block 313 is now entered where a check is made again to see if data is available. If the answer is "no", block 315 is entered and a check made to see if the carrier detect is a 1. If it is, the program loops back to block 313. Otherwise, as indicated by circle B, 317, block 303 of FIG. 8 is entered to again perform the carrier detection function. Assuming data is available, a check is made in block 319 to see if the stack of data is equal to 20. Incoming data from microprocessor 127 is put in a stack and up to 20 dibits can be stacked. If the stack is full, the program loops back to block 313. Normally, the stack will not be full and as indicated by block 321 data will be gotten and the top of stack pointer incremented. In Block 322 the stack is then incremented and a check made to see if the top of stack pointer is equal to zero. If it is not, then block 323 is entered and data is put in the top of the stack. If the top of the stack pointer is at zero after being incremented, then in accordance with block 325 the top of the stack pointer is set equal to 20, before block 323 is entered. The program now goes back to block 313. Thus, as data becomes available it is put into the stack and the stack pointer reset each time. Each time the stack pointer gets to the bottom it is reset to the top in conventional fashion.

FIG. 9 shows a manner in which data is put into the stack. Although put in basically at a 1/600 of a second there is some variation in this rate. Generally, the stack should remain about half full for best operation.

FIG. 10 illustrates the manner in which data is taken out of the stack. An internal interrupt is generated at a fixed rate. The timer interrupt was enabled by block 309 of FIG. 8. On an interrupt, block 331 is entered and the present processing being carried out is saved. This is what is meant by "push w." In addition, a test bit is complemented. The test bit has as its purpose indicating whether it is the first bit of the dibit or the second bit of the dibit which is to be output on that particular cycle. Assume that it is the first bit of the dibit. In that case, the test bit is zero. After making a check of this in block 333, block 335 is entered to check if the stack is empty. If the stack is empty, the carrier detect is cleared as indicated by block 356 and the material previously being processed is brought back as indicated by the command "pop w" in block 357 and the program returns from the interrupt to the main program, in this case ending up again look for a carrier as shown in FIG. 8. Assuming the stack is not empty, block 359 is entered and the bottom of the stack is moved to the output. (Note that in accordance with FIG. 9 new data is put at the top of the stack.) The stack is then decremented as indicated by block 361 and the bottom of the stack pointer incremented as indicated by block 363. A check is made in block 365 to see if the pointer is at zero and if it is it is reset to 20 as indicated in block 367. Then, a constant is added to the timer register as indicated in block 369. This is done because the clock frequency will not give exactly 1/1200 of a second. By adding this constant, the timer will generate an interrupt at exactly 1/1200 of a second. If desired, as indicated above, the rate can be adjusted slightly as a function of the number of dibits in the stack. Thus, the rate can be made slightly more than 1/1200 of a second, or less, to allow the stack to become more full or emptier as the need arises. After doing this, as indicated by block 371, the step being performed before the interrupt is brought back and the program returns to the main program of FIGS. 8 and 9.

On the next interrupt, the test bit is complemented in block 331 and it is now not a zero. Thus, block 373 is entered. This causes the dibit to be shifted in the output register. Only a single line, the line 129 is taken off of the output register in microprocessor 128. The second bit is present but not used. By causing a shift, the second bit of the dibit now appears on the output line. In block 374, a constant is added to the timer register again and then in block 375 the previous material brought back to the program register and a return to the main program.

The result on line 133 is a decoded serial stream of data at the desired baud rate of 1200.

What is claimed is:

1. An all digital modem comprising:
   a. means for generating four waveforms at a desired transmission frequency but mutually phase shifted by 90 degrees;
   b. a first microprocessor programmed to receive digital data at its input, to convert said data into dibits and to select as a modem output one of said four waveforms phase shifted 90 degrees with respect to each other;
   c. means for detecting zero crossings of an incoming modulated signal and providing a zero crossing output signal;
   d. means for indicating whether each zero crossing occurs with the incoming modulated signal going positive or negative;
   e. a second microprocessor coupled to receive said zero crossing signal along with said signal containing parity information and programmed to simultaneously use said signals to maintain synchronization with said incoming modulated signal and to convert the information contained therein into dibits representing the data on the incoming modulated signal; and
   f. a third microprocessor receiving dibit outputs from said second microprocessor as inputs and programmed to convert said dibits into a serial stream of data, at essentially constant frequency.

2. A modem according to claim 1 and further including a fourth microprocessor for receiving serial data to be transmitted, encoding said data and providing said data in parallel form to said first microprocessor.

3. A demodulator for a digital modem comprising:
   a. means for generating a pulse at each zero crossing of an incoming modulated waveform to be demodulated;
   b. means for indicating whether each zero crossing occurs with the waveform going positive or negative;
   c. a first microprocessor having as inputs said pulses and the output of said means for indicating, said microprocessor programmed to simultaneously use said information to maintain synchronization with said incoming modulated waveform and to determine, from said information, dibits corresponding to the demodulated incoming waveform being received and to provide said dibits as outputs, at a rate equal to about one half an established data rate; and
   d. a second microprocessor receiving as inputs said dibit information from said first microprocessor and programmed to convert said dibit information into a serial bit stream at the desired data rate.

4. Apparatus according to claim 3, wherein said means for generating pulses at each zero crossing comprise:
   a. means to convert the incoming signal into a square wave having rising and falling edges occurring at the times of zero crossings;
   b. first and second one-shot multivibrators responsive respectively to said rising and falling edges; and
   c. means for combining the outputs of said one-shot multivibrators to thereby provide a series of pulses, one occurring at each zero crossing.

5. Apparatus according to claim 4, wherein said means for indicating comprise an output from said means for converting into a square wave coupled as an input to said first microprocessor, whereby by determining the parity of said waveform and maintaining its history, rising and falling edges can be differentiated.

6. Apparatus according to claim 5, wherein said microprocessors comprise PIC 1656 microprocessors.

7. Apparatus according to claim 5 wherein said microprocessors comprise PIC1 670 microprocessors.

8. In a digital modem, a method of demodulating an incoming analog waveform modulated with dibit information obtained from a serail data stream, comprising:
   a. detecting the zero crossings of said waveform;
   b. keeping track of whether the zero crossings occur on a rising or falling waveform;
   c. measuring times between zero crossings of said incoming analog waveform;
   d. after the total time between a first measured zero crossing and a current measured zero crossing exceeds the amount of time between expected data changes comparing a function of said time with predetermined limits to determine whether or not a phase shift has occurred and if so the amount of said phase shift;

e. in accordance with the amount of phase shift determined, generating a dibit to thereby extract information from the incoming analog waveform data contained therein;

f. storing a plurality of said dibits as they are determined; and g. at a fixed rate, converting said dibits to serial data and providing said data as an output data stream, whereby said data stream will accurately represent a data stream used to generate the incoming analog signal.

9. The method according to claim 8, comprising carrying out said steps of steps a to e in a first microprocessor and said steps f and g in a second microprocessor.

10. The method according to claim 9, and further including periodically resynchronizing said first microprocessor.

11. The method according to claim 10, wherein said step of providing said data as an output comprises:
  a. loading dibits, as they are generated into one end of a stack in said second microprocessor;
  b. generating internal interrupts at a fixed rate;
  c. on the first of alternate interrupts moving the dibit at the other end of said stack to an output register one bit of which is coupled to the output data line and on the other of the alternate interrupts shifting the dibit in said output register, whereby in sequence the first and second bits of the dibit will thus be provided as serial outputs.

12. The method according to claim 11, and further including, prior to loading data at one end of said stack detecting the presence of a carrier and providing a carrier detection output indicating that a carrier is present.

13. The method according to claim 12, and further including clearing the carrier detection output if the stack becomes empty and then again checking for a carier presence.

14. The method according to claim 13, wherein the step of generating said dibit includes the steps of:
  a. keeping track of current and old times between measurements, times of measurements and parity;
  b. upon initiation of a cycle transferring the time between the last two measurements to an N$\Delta$P old register and transferring the last measurement time $T_N$ to a $T_P$ register and pushing the parity stack;
  c. reading a new time $T_N$, parity and calculating from $T_N$ and $T_P$ a new value N$\Delta$P;
  d. calculating a value equal to the former value of $\Delta$+N$\Delta$P;
  e. providing a no change reservoir register and increasing its value by an amount N P with each reading;
  f. allowing said no change reservoir to overflow when the value therein exceeds 1/600 second plus an offset;
  g. upon overflow, calculating from the dibit value and from the direction of change, as indicated by the parity bits, and providing said bit as an output;
  h. subtracting 1/600th second from the no change reservoir;
  i. setting $\Delta$ equal to zero; and
  j. returning to step b.

15. The method according to claim 14, wherein said cycle further includes setting a parity bit $P_4$ equal to zero at the end of each cycle at the time when $\Delta$ is set to zero and said step of calculating the dibit includes:
  a. comparing the present parity with said parity $P_4$ at the time of calculation;
  b. if $P_4$ and the present parity are not equal adjusting the value of $\Delta$ by 180 degrees;
  c. reducing the value of $\Delta$ to a value less than 360 degrees by successively subtracting 360 degrees therefrom; and
  d. comparing the value of $\Delta$ when less than 360 degrees with predetermined limits, said value or said limits being offset by 45 degrees, to determine which dibit has been detected.

16. The method according to claim 15, wherein said step of resynchronizing comprises:
  a. each time data is read determining from the value of N$\Delta$P whether a phase change has definitely occurred and if a phase change has occurred, setting $\Delta$ equal to the present value of N$\Delta$P plus the old value of N$\Delta$P and setting a parity bid $P_3$ equal to the present parity;
  b. storing the present time as the past time and pushing the parity stack;
  c. reading data and calculating N$\Delta$P using the present value $T_N$ and the value $T_P$ previously stored;
  d. checking to see if a value of $\Delta$+N$\Delta$P is less than 500 degrees;
  e. continuing to read data and calculate N$\Delta$P and checking the sum of this value and $\Delta$ until a value of 500 degrees is exceeded;
  f. then setting $\Delta$ equal to $\Delta$+N$\Delta$P;
  g. calculating the dibit using $\Delta$ and $P_3$ and providing the dibit as an output;
  h. setting $\Delta$ and $P_3$ equal to zero and $P_4$ equal to $P_N$;
  i. resetting the no change reservoir to N P plus a constant offset to insure overflow after 1/600th second;
  j. storing the present value $T_N$ as $T_P$ and pushing the parity stack;
  k. reading data and calculating N$\Delta$P; and $\Delta$
  l. then carrying out steps d-i of claim 12.

17. The method according to claim 16, wherein said step of calculating said dibit comprises:
  a. checking to see if $P_3$ is equal to $P_N$ and if not adjusting $\Delta$ by 180 degrees;
  b. checking to see if $\Delta$ is greater than 360 degrees and successively subtracting therefrom 360 degrees until the value of $\Delta$ is below 360 degrees; and
  c. comparing said remaining value with predetermined limits, one of said value and said limits offset by 45 degrees to determine which dibit is present.

* * * * *

UNITED STATES PATENT AND TRADEMARK OFFICE
CERTIFICATE OF CORRECTION

PATENT NO. : 4,573,166            Page 1 of 5
DATED : February 25, 1986
INVENTOR(S) : Carlton FREDERICK It is certified that error appears in the above-identified patent and that said Letters Patent is hereby corrected as shown below:

| Column | Line | |
|---|---|---|
| 2 | 30 | Change "date" to --data--. |
| 3 | 15 | Change "an" to --a--. |
| 3 | 23 | Delete "a". |
| 3 | 42 | Delete first occurence of "to". |
| 4 | 3 | After "dibits" insert --,--. |
| 4 | 4 | After "register" insert --is--. |
| 4 | 4-5 | Change "deter-mined" to --deter-mines--. |
| 4 | 58 | Change "a" to --an--. |
| 6 | 5 | After "572" insert --,--. |
| 6 | 6 | After "scrambler" insert --,--. |
| 6 | 21 | Change "then which is" to --which is then--. |
| 6 | 58 | Change "a" to --an--. |

UNITED STATES PATENT AND TRADEMARK OFFICE
CERTIFICATE OF CORRECTION

PATENT NO. : 4,573,166
DATED : February 25, 1986
INVENTOR(S) : Carlton FREDERICK It is certified that error appears in the above-identified patent and that said Letters Patent is hereby corrected as shown below:

| Column | Line | |
|---|---|---|
| 7 | 35 | Change "poing" to --point--. |
| 7 | 57 | After "Tn" insert --,--. |
| 7 | 62 | After "zero" insert --,--. |
| 8 | 3 | After "Hz" insert --frequency--. |
| 8 | 6 | After "example" insert --,--. |
| 8 | 25 | Change "partiy" to --parity--. |
| 8 | 31 | After "221," insert --△--. |
| 8 | 34 | Before "check" insert --a-- and after "whether" insert --△--. |
| 8 | 36 | After "is" insert --a--. |
| 8 | 43 | After first occurrence of "if" insert --△--. |
| 8 | 50 | After "If" insert --△--. |
| 8 | 51 | Change "235" to --236--. |

UNITED STATES PATENT AND TRADEMARK OFFICE
CERTIFICATE OF CORRECTION

PATENT NO. : 4,573,166  Page 3 of 5
DATED : February 25, 1986
INVENTOR(S) : Carlton FREDERICK It is certified that error appears in the above-identified patent and that said Letters Patent is hereby corrected as shown below:

| Column | Line | |
|---|---|---|
| 8 | 60 | After "243" insert --,--. |
| 8 | 64 | After "Here," insert --△--. |
| 9 | 4 | Delete first occurrence of "to see". |
| 9 | 26 | After "if" insert --△--. |
| 9 | 35 | After "if" insert --△--. |
| 9 | 48 | After "Here" insert --△-- and after "P4 set" insert --=--. |
| 10 | 22 | Delete "has been set". |
| 10 | 25 | Delete both occurrences of "a 11" and insert --an 11-- (non bold-face 11) in each case. |
| 10 | 26 | Delete "a 11" and insert --an 11" (non bold-face 11). |
| 10 | 36 | Delete "a" and insert --A,--; also after "FIG. 9" insert --,--. |

UNITED STATES PATENT AND TRADEMARK OFFICE
CERTIFICATE OF CORRECTION

PATENT NO. : 4,573,166  Page 4 of 5
DATED : February 25, 1986
INVENTOR(S) : Carlton FREDERICK It is certified that error appears in the above-identified patent and that said Letters Patent is hereby corrected as shown below:

| Column | Line | |
|---|---|---|
| 10 | 49 | After "of" insert --the--. |
| 10 | 51 | After "of" insert --the--. |
| 10 | 62 | After "second" insert --rate--. |
| 11 | 14 | Change "look" to --looking--. |
| 11 | 22 | After "if it is" insert --,--. |

IN THE CLAIMS

| Claim | Line | |
|---|---|---|
| 8 | 57 | Change "serail" to --serial--. |
| 8 | 66 | After "changes" insert --,--. |
| 8 | 68 | After "if so" insert --,--. |
| 13 | 41 | Change "carier" to --carrier--. |
| 14 | 47 | After "cycle" insert --,--. |

UNITED STATES PATENT AND TRADEMARK OFFICE
CERTIFICATE OF CORRECTION

PATENT NO.  : 4,573,166           Page 5 of 5
DATED       : February 25, 1986
INVENTOR(S) : Carlton FREDERICK It is certified that error appears in the above-identified patent and that said Letters Patent is hereby corrected as shown below:

| Claim | Line | |
|-------|------|---|
| 15 | 14 | After "equal" insert --,--. |
| 16 | 25 | After "read" insert --,--. |
| 16 | 44 | After "N" insert --△--. |
| 16 | 50 | Change "12" to --14--. |

Signed and Sealed this

Eleventh Day of August, 1987

*Attest:*

DONALD J. QUIGG

*Attesting Officer*    *Commissioner of Patents and Trademarks*